Patented Dec. 30, 1924.

1,521,306

UNITED STATES PATENT OFFICE.

JOHN R. McDERMET, OF JEANNETTE, PENNSYLVANIA, ASSIGNOR TO ELLIOTT COMPANY, OF PITTSBURGH, PENNSYLVANIA, A CORPORATION OF PENNSYLVANIA.

METHOD OF TREATING WATER.

No Drawing. Application filed June 9, 1920. Serial No. 387,701.

*To all whom it may concern:*

Be it known that I, JOHN R. McDERMET, a citizen of the United States, residing at Jeannette, Westmoreland County, Pennsylvania, have invented a new and useful Method of Treating Water, of which the following is a full, clear, and exact description.

My invention has relation to the treatment of water, particularly feed-water for use in boilers and heating apparatus.

The object of my invention is to provide a method of treatment by which the water delivered to the boiler or other heater will be substantially free from air and other dissolved gases, and also from scale-forming compounds.

It is well known that oxygen and free, or "half-bound" carbon dioxide, contained in boiler feed-water, are largely responsible for the internal corrosion which occurs in steam and heating systems, and many attempts have been made to free the feed-water of these elements. It is also well-known that carbonates, such as magnesium and calcium carbonates, constitute the bulk of scale-forming materials in normal waters, and it is highly desirable that these should be removed or rendered soluble to prevent scale formation.

For certain purposes, the treatment of water by passing it through zeolite filter beds has proven effective, particularly in textile work, but this method of treatment has not been satisfactory in boiler practice, since it does not remove oxygen nor free carbon dioxide which remains in solution. As a result, carbon dioxide is carried into the boiler where it is regarded as highly objectionable, inasmuch as it appears to accelerate electrolytic corrosion by acting as an electrolyte. Furthermore, the use of filter beds of zeolites necessitate frequent regeneration of the zeolite. As ordinarily applied to the art of water treatment, zeolites or exchange base silicates are complex aluminum silicates. At the outset the complex silicate is made up, for instance, of sodium aluminum bases. In passing through the zeolite filter beds, calcium and magnesim compounds, which are dissolved in the water in any form such that they will precipitate in an insoluble form in the boiler in the subsequent evaporation, or will react chemically with other compounds dissolved in the water under the boiler conditions to form an insoluble precipitate, interchange bases with the sodium of the zeolite and become sodium compounds which are completely soluble under moderate and usual boiler pressure.

I have discovered that the zeolite method of treatment may be rendered much more effective and well adapted for use in the treatment of boiler feed-water by combining therewith a proper method of extracting air and other dissolved gases from the water, and in which treatment bicarbonates of calcium and magnesium are precipitated to an extent in excess of their solubility as carbonates.

For this purpose, I prefer to employ the method of treatment which is described and claimed in the patent to William S. Elliott, No. 1,321,999, dated November 18, 1919.

The method described in that patent is capable of removing dissolved oxygen and carbon dioxide from water; of decomposing bicarbonates of calcium and magnesium which would otherwise be changed to sodium bicarbonate in passing through the zeolite and be decomposed in the boiler; and also of decomposing bicarbonates of calcium and magnesium to form carbonates of calcium and magnesium, the carbonates being precipitated in excess of their solubility of carbonates.

In my preferred method of treatment, I therefore first subject the water to a method of treatment such as described and claimed in said Patent No. 1,321,999. The treated water is then passed to a zeolite filter bed, under conditions which will prevent reabsorption of air in this stage of the treatment and contamination of the water by carbon dioxide contained in the air.

The result of this treatment is that the water is delivered to the boiler substantially freed from oxygen, and from "half-bound" carbon dioxide and with the scale-forming compounds eliminated.

Since the base exchanging properties of the zeolite are a perfectly definite quantity, another result of my invention is that by reason of the removal of a very considerable amount of the dissolved impurities during the air extraction treatment, the amount of water which may be properly treated by the zeolite between successive regenerations thereof is greatly increased. There is a correspondingly material reduction in the cost of operation including the cost of the regenerative reagent per unit quantity of softened water.

The air extraction treatment above referred to is capable of decomposing bicarbonates of calcium and magnesium, which are soluble in water containing carbon dioxide to the extent of 1800 parts per million, to carbonates of calcium and magnesium which are soluble in the value of 108 to 18 parts respectively.

I claim:

1. The method of treating feed-water which consists in extracting from the water to be heated the air and other gases dissolved therein, and simultaneously precipitating therefrom bicarbonates of calcium and magnesium to an extent in excess of their solubility as carbonates, and then subjecting the water to the action of a zeolite, substantially as described.

2. The method of treating feed-water which consists in first producing evaporation of the water to an extent sufficient to effect the removal therefrom of its contained "half-bound" carbon dioxide, and then passing the water through a zeolite filter, substantially as described.

3. The method of treating feed-water which consists in introducing the heated water into an evaporator in which the pressure is lower than the pressure corresponding to the temperature of the water before it enters the evaporator, and thereby freeing the water of its contained air and dissolved carbon dioxide and also precipitating therefrom bicarbonates of calcium and magnesium, and thereafter passing the water through a zeolite filter to convert a portion of its calcium and magnesium compounds into sodium compounds, substantially as described.

4. The method of treating feed-water which consists in first producing evaporation of the water to an extent sufficient to effect the removal therefrom of its contained "half-bound" carbon dioxide, then passing the water through a zeolite filter, and preventing contamination of the water in the zeolite filter from reabsorption of air and contamination from carbon dioxide contained in the air, substantially as described.

5. In the method of treating feed water, the steps consisting of preliminarily removing the dissolved air and other gases and the dissolved bicarbonates from the water to partially soften the same, and then subjecting the partially softened water to a final softening operation in a zeolite softener, substantially as described.

6. In the method of treating feed water, the steps consisting of preliminarily removing the dissolved air and other gases and precipitating the dissolved bicarbonates from the water as insoluble bicarbonates to partially soften the water, and then subjecting the partially softened water to the action of zeolite, whereby the base exchanging properties of the zeolite are not consumed by the bicarbonates, substantially as described.

7. In the method of treating feed water in a zeolite softener, the steps consisting of conserving the base exchanging properties of the zeolite by subjecting the water to a heat exchanging operation to preliminarily precipitate the dissolved bicarbonates therefrom as insoluble bicarbonates and effect removal of the dissolved air and other gases, and then feeding the degasified water with the insoluble bicarbonates to the zeolite softener, whereby said bicarbonates are incapable of consuming the base exchanging properties of the zeolite or of forming soluble sodium salts, substantially as described.

In testimony whereof I have hereunto set my hand.

JOHN R. McDERMET.